April 26, 1932.          R. A. RASNER          1,855,311
SAW
Filed Jan. 9, 1930
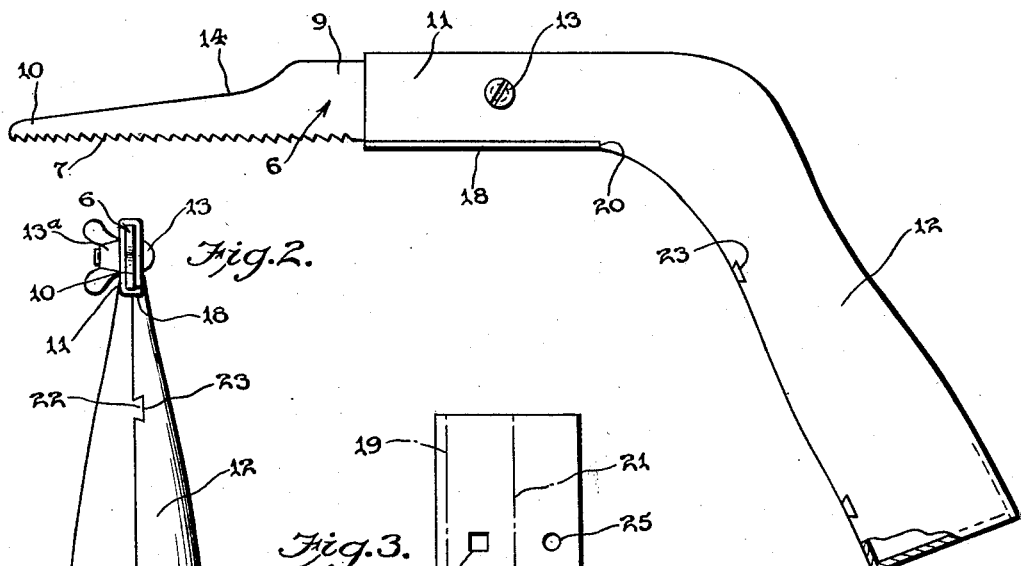
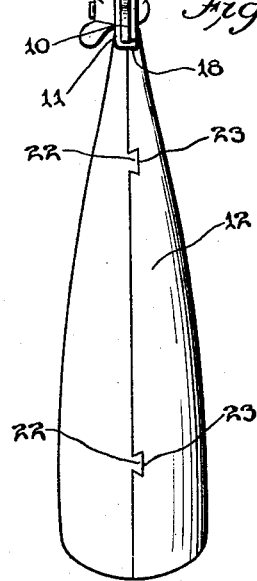
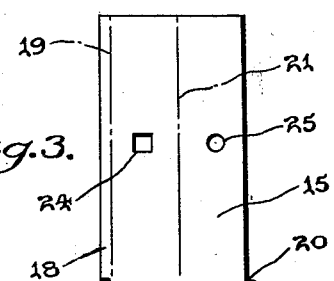
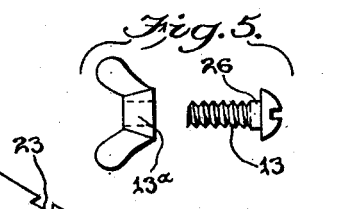
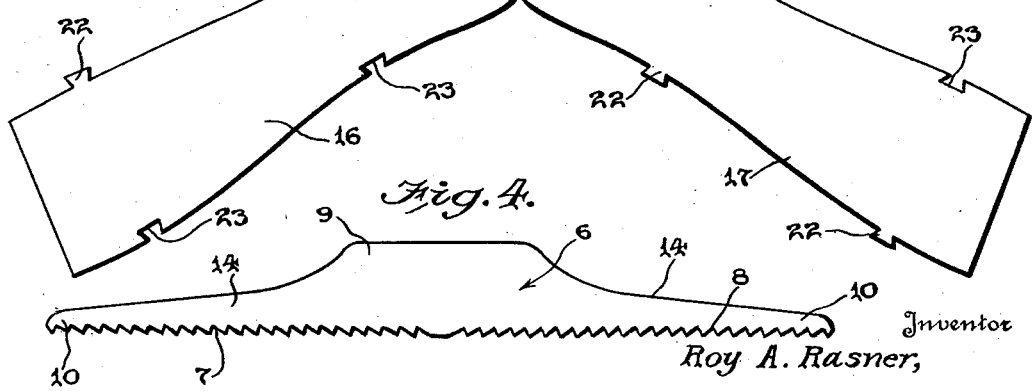
Inventor
Roy A. Rasner,
By Seymour & Bright
Attorneys Patented Apr. 26, 1932

1,855,311

UNITED STATES PATENT OFFICE

ROY ANTLE RASNER, OF NASHVILLE, TENNESSEE

SAW

Application filed January 9, 1930. Serial No. 419,646.

This invention relates to improvements in saws, and more especially to a novel saw adapted to work in small or confined spaces.

The saw is designed mainly for use in removing broken pipes from pipe fittings, and broken or twisted off cap screws, bolts and studs, without damaging the threads. In using the saw for removing screws, bolts and studs, a hole is first drilled as large as they will stand without touching the threads. Then the saw is used to cut the rim of it in two. Subsequently, a property shaped punch or chisel is used to close the space left by the saw, and then by the application of a little oil it is readily removed.

This saw can also be used for many other purposes, and is especially useful for lock fitting purposes.

The primary object of the invention is to furnish a saw which is specially shaped to operate in small confined spaces.

Another object is to provide a saw including a reversible blade, either end of which may be clamped in the handle.

A still further object is to furnish a saw handle of novel construction, which may be manufactured out of sheet metal.

With the foregoing objects outlined and with other objects in view which will appear as the description proceeds, the invention consists in the novel features hereinafter described in detail, illustrated in the accompanying drawings, and more particularly pointed out in the appended claims.

Referring to the drawings,

Fig. 1 is a side elevation of my improved saw.

Fig. 2 is a front view of the same.

Fig. 3 is a plan view of the blank from which the handle is made.

Fig. 4 is an elevation of the reversible blade.

Fig. 5 is an elevation of the clamp bolt and nut used with the handle.

In the drawings, 6 indicates my improved saw blade which is made of any suitable metal, and provided with oppositely extending sets of teeth 7 and 8. The toothed portions of the blade are tapered from the intermediate portion 9 of the blade to the ends 10 of the latter to provide relatively narrow cutting portions which may operate in relatively small spaces. Either end of this blade is adapted to be inserted into the socket 11 of the handle 12, and to be clamped therein by means of the clamping screw and nut 13 and 13a; the screw also acting as a stop to limit the insertion of the blade into the handle. When the blade is inserted, its tapered edge 14 abuts against the screw 13.

The improved handle forming part of this tool may be made from a sheet metal stamping of the kind shown in Fig. 3. This stamping includes three arms 15, 16 and 17, which diverge from one another. The arm 15 is bent to form a rectangular socket to receive the blade, while the arms 16 are shaped to provide a rounded grip.

It will be noted that one edge of the arm 15 is provided with a wing 18 which is bent along the line 19, into a position at right angles to the metal blank, to provide the bottom of the socket, as shown in Fig. 2. The opposite edge of the arm 15 is cut away as at 20 to accommodate this wing, when the handle is folded along the line 21. To provide a comfortable grip, each of the arms 16 is first bent longitudinally into substantially semi-cylindrical shape, and when the blank is folded along the line 21, the side edges of the arms 16 come into abutting relation, and these edges are secured together by any suitable means. For example, certain of the edges may be provided with dovetailed tongues 22, and the other edges provided with dove-tailed notches 23 to receive the tongues.

With such a construction, it will be apparent that the lower end of the grip will be left open unless it is desired to plug the same. Such a plug may be formed as part of the metal blank, or it may be a separate disk which is soldered into place as indicated in Fig. 1.

At the time of stamping the handle blank, the arm 15 may be provided with a square aperture 24, and a round aperture 25, these apertures being arranged at opposite sides of the line 21, so that the apertures will come into registration when the blank is folded along said line. The square aperture receives a square portion 26 on the screw 13, so that the latter will not turn while the thumb nut 13a is being tightened or loosened.

It will be noted from Fig. 1 that the tapered edge 14 abuts against the screw when the blade is inserted in the socket, and of course, when the thumb nut 13a is tightened, the side walls of the socket will clamp the blade rigidly in position.

While I have disclosed the invention in such manner that the construction, operation and advantages thereof may be readily understood by those skilled in the art, I am aware that changes may be made in the details disclosed, without departing from the spirit of the invention, as expressed in the claims.

What I claim and desire to secure by Letters Patent is:

1. In a saw of the character described, a handle formed of a three-armed sheet metal blank, one of the arms being folded and shaped to provide a socket, and the other arms being shaped and connected together to form a hand grip, a blade extending into the socket, and means for clamping the blade in the socket.

2. In a saw of the character described, a handle formed of a three-armed sheet metal blank, one of said arms forming a socket and having at one of its side edges a wing, and its opposite side edge recessed to receive said wing, the other arms being shaped to form a hand grip and having abutting connected edges, a blade extending into said socket, and means for detachably securing the blade in the socket.

3. A saw of the character described, comprising a handle provided at one end with a rectangular socket, a saw blade having an imperforate end extending into said socket, one edge of said end engaging a wall of said socket and the opposite edge of said end being gradually tapered toward the inner extremity of the end, and clamping means spanning the socket and arranged in close proximity to the last mentioned edge of the blade.

4. In a saw of the character described, a sheet metal handle including arms arranged at angles to one another, one of said arms forming a rectangular socket having a seam extending along a single line only of the socket, the other arm being of substantially tubular form with seams extending along diametrically opposite sides of the same, one of the seams of the last mentioned arm merging into the seam of the socketed arm, a blade extending into the socket, and means for clamping the blade in the socket.

In testimony whereof, I have signed this specification.

ROY ANTLE RASNER.